United States Patent Office 2,904,527
Patented Sept. 15, 1959

2,904,527
METHOD OF PREPARING RUBBER COMPOSITION COMPRISING ASPHALTIC OIL AND RUBBER

Leo Garwin, Oklahoma City, Okla., assignor to Kerr-McGee Oil Industries, Inc., a corporation of Delaware No Drawing. Application October 21, 1955
Serial No. 542,086

4 Claims. (Cl. 260—33.6)

This invention relates to softened and extended rubber compositions of improved pigmenting response and to the method of preparing these compositions.

The term "rubber(s)" as used in this description and claims, embraces both natural rubber, in all of its various raw and reclaimed forms, as well as various synthetic rubbers, i.e., rubber polymers of the type which may be vulcanized with sulfur or other vulcanizing agents. Representative synthetic rubbery polymers of this variety are the homopolymerization products of butadiene and those of its homologues and derivatives, as for example, methyl butadiene, di-methyl butadiene, pentadiene, and chloroprene (neoprene synthetic rubber), as well as copolymers such as those formed from butadiene, or its homologues or derivatives, with other unsaturated organic compounds. Among the latter are acetylenes, as vinyl acetylene, olefins, as isobutylene which copolymerizes with butadiene to form butyl synthetic rubber; vinyls, as vinyl chloride, acrylic acid, acrylonitrile (which polymerizes with butadiene to form the synthetic rubber Buna N), methacrylic acid and styrene, the latter compound polymerizing with butadiene to form the synthetic rubber Buna S, as well as vinyl esters and various unsaturated aldehydes, ketones and ethers, e.g., acrolein, methyl isopropenyl ketone, and vinyl ethyl ether. The foregoing rubber materials, including both natural rubber as well as the various synthetic rubbers, may be defined as rubbery polymers of at least one compound selected from the group consisting of the conjugated diolefins and chloroprene.

A number of other ingredients are blended with rubber prior to vulcanization. Because of the physical condition of these rubbers, it is usually necessary to effect this blending or compounding as the rubber is masticated on a mill or in a mixer. The mastication or mixing process is accompanied by the generation of large amounts of heat with the result that there is danger of premature vulcanization. In order to reduce the generated heat, it is conventional to add softening and extending agents which act to swell and soften the rubber and thereby accelerate the mechanical action of the masticator or mixer.

The more economical softeners and extenders are petroleum residues such as asphalts or blends of asphalt with petroleum extracts (naphthenics) or cracked products. These commercial softeners and extenders are inherently dark and therefore relatively unresponsive to pigmentation. Because of this, excessive amounts of pigments are required to obtain the desired coloring of the rubber and these large amounts of pigments adversely affect the rubber properties. As a result, the demand of the rubber goods users for a greater variety of colored goods cannot be economically met.

Furthermore, the petroleum residue type softeners and extenders have poor scorch properties as illustrated by U.S. Patent 2,582,264 and require the use of anti-scorch agents such as naphthenic acid to obtain a proper balance of properties in the finished rubber composition. This is true even when the reduced crude is cut back with naphthenic extracts or cracked distillate fractions. The use of paraffinic extracts is uneconomical, and in addition they increase the bloom tendencies of the oil.

Consequently, the rubber compounders are using, for rubbers other than dark rubbers, the higher priced softeners and extenders obtained from lighter petroleum fractions or other non-petroleum materials in order to avoid the inherent pigmentation difficulties of the more inexpensive petroleum residue type softeners and extenders.

In accordance with the present invention, I have discovered that an asphaltic oil as hereinafter described may be used as a rubber extender and softener, and that it is free of the inherent disadvantages of the usual petroleum residue type extenders and softeners. In this respect, it has improved pigmentability and excellent scorch properties, and it imparts a proper balance of other physical properties to the finished rubber. Furthermore, as compared with other extenders such as asphalt, resins and asphaltenes, the asphaltic oil of the present invention may be incorporated into the rubber at a relatively low power consumption. In fact, its power consumption requirements are equivalent of those required by the higher priced light fraction type of petroleum extenders and softeners. Another advantage of my extender and softener is the excellent tubing properties imparted to the rubber.

The term "asphaltic oil" as used herein refers to oils which are substantially free from asphaltenes and resins and are derived from an asphaltic bituminous material. By the latter term is meant semi-solid bituminous residues obtained by refining hydrocarbons (crudes) and naturally occurring asphalts (bitumins and pyrobitumins). Examples of naturally occurring asphalts include gilsonite, graphamite, wurtzilite, albertite, elaterite, native asphalts, such as Trinidad asphalt, etc. Asphaltic oils may be obtained by any of the solvent refining methods known to the art, but preferably in accordance with the teaching in copending application Serial Number 218,480, filed March 30, 1951, now Patent No. 2,783,188, or Serial Number 377,201, filed August 28, 1953, now abandoned. Application Serial Number 218,480 obtains an asphaltic oil by cold precipitation of asphaltenes from asphalt with pentane and related solvents and percolation of the resulting asphaltene-free pentane-petrolene solution through an adsorbent such as fuller's earth. Application Serial Number 377,201 obtains asphaltic oil by hot precipitation of asphaltenes from asphalt with pentane or a similar solvent and then effects separation of the resins from the oil in the resulting solution at a temperature equal to or higher than the paracritical temperature of the solvent and at a pressure maintaining the solvent in essentially a liquid phase.

The asphaltic oils which are suitable for the present invention are the dark green oils substantially free of asphaltenes and resins which have a Saybolt Furol viscosity at 210° F. of about 35 to 100 seconds and higher and a specific gravity at 60° F. of less than about 0.97. The viscosity index of these oils is about 70 and higher.

The asphaltic oil obtained by the method described in copending application Serial Number 218,480 is preferred in that it is substantially free of active polar groups as compared with the asphaltic oil obtained by the method of application Serial Number 377,201. This preferred asphaltic oil generally has a Saybolt Furol viscosity at 210° F. of from 35 to 65 seconds with excellent outer tone, while the asphaltic oil obtained by the method of application Serial Number 377,201 has a Saybolt Furol viscosity at 210° F. of from 65 to 100 seconds and higher, with poorer color characteristics. When the method of application Serial Number 377,201 is used to prepare asphaltic oil having a Saybolt Furol viscosity at 210° F. of 35 to 60 seconds, the color compares favorably with asphaltic oil obtained by the method of application Serial Number 218,480.

A Rostler analysis of suitable asphaltic oil derived from a Mid-Continent base crude and having a Saybolt Furol viscosity at 210° F. of from about 35 to 65 seconds indicated the following composition:

| Component | Percent | Preferred (to nearest Percent) |
|---|---|---|
| Asphaltenes | 0 | 0 |
| Nitrogen Bases | 33.9–34.1 | 34 |
| First Acidifins | 17.8–18.2 | 18 |
| Second Acidifins | 29.5–32.5 | 31 |
| Paraffin | 15.8–18.2 | 17 |

In accordance with the present invention, the asphaltic oil may be added to the rubber by either of two methods. Thus, the asphaltic oil may be added as an emulsion to the latex (masterbatching) or may be added by mastication of the oil with the rubber stock. It is found that good results are obtained by either method of addition. The asphaltic oil emulsion may be made by a number of suitable methods known in the art. However, a preferred method for the preparation of particularly desirable emulsions is disclosed in application Serial No. 448,158, filed August 5, 1954.

Irrespective of the method of addition of the asphaltic oil to the rubber, it is found that up to 25 parts by weight of asphaltic oil may be added to each 100 parts by weight of rubber by the normal compounding procedures. At least one part by weight of asphaltic oil to each one hundred parts by weight of rubber is required in order to obtain any appreciable softening effect.

The use of the asphaltic oils in the present invention as rubber softeners and extenders permits the rubber compounder to use a cheaper extender and softener oil without the necessity for excessive loading of the rubber with pigment with its accompanying deleterious effect. Furthermore, the finished product will have a proper balance of physical properties. Thus, rubber compositions softened and extended with the asphaltic oil of my invention show exceptional resistance to tear and cut growth and excellent flex resistance. In fact, the abrasion resistance (wear) of rubber compositions containing this asphaltic oil was superior to that obtained by rubbers using commercial petroleum residue type extenders and softeners.

The following examples are for the purpose of illustration only and are not limiting to the scope of the present invention which is set forth in the claims.

EXAMPLE I

The following composition suitable for use as a tire stock was prepared and tested using an asphaltic oil of dark green color having a Saybolt Furol viscosity at 210° F. of 90 seconds and a specific gravity at 60° F. of 0.96 and obtained by the method of copending application Serial No. 377,201.

*Basic test formula*

| | Parts by weight |
|---|---|
| GRS–1500 | 100.00 |
| Zinc oxide | 3.00 |
| Stearic acid | 1.50 |
| HAF black | 55.00 |
| Sulfur | 2.00 |
| Santocure [1] | 1.25 |
| Asphaltic oil | 15.00 |

[1] Santocure is a proprietary trademark for an accelerator identified as N-cyclohexyl-2-benzothiazole sulfenamide.

The basic formula ingredients minus the oil, accelerators and sulfur were mixed in a banbury. Then the oil, sulfur and accelerators were added and incorporated. The stock dumped readily from the banbury and gave the test results listed below. As a control, the asphaltic oil was compared with Califlux TT, a product described in an article entitled "Petroleum Products for Rubber" appearing in the June 1948 issue of Rubber Age.

| Stock | ML–4 at 212° F. Mooney | 260° F. Mooney Scorch, minutes | Power Consumed, Watt Hrs. | Graney Die, wt. grams | Extrusion Length, ft. |
|---|---|---|---|---|---|
| Asphaltic Oil | 64.0–64.5 | 53.0 | 511 | 357 | 11 |
| Califlux TT | 62.5–63.0 | 40.0 | 504 | 284 | 9 |

UNAGED PHYSICALS—ASTM D412-D624

| Stock | 287° F. Cure, minutes | 300% Modulus | Tensile, #/in.² | Percent Elongation | Shore Hard Creep | Tear, #/in. | Goodrich Heat Generation, ° F. |
|---|---|---|---|---|---|---|---|
| Asphaltic Oil | 30 | 800 | 2,340 | 690 | 55–49 | 390 | |
| Do | 45 | 1,390 | 3,025 | 585 | 61–57 | 271 | |
| Do | 60 | 1,580 | 2,920 | 500 | 63–59 | 307 | 65 |
| Do | 90 | 1,790 | 3,040 | 485 | 63–59 | 231 | 62 |
| Califlux TT | 60 | 1,830 | 3,215 | 495 | 64–61 | 244 | 62 |

GEER OVEN AGED STRESS STRAIN ASTM D412-D573 AND D624

| Stock | 287° F. Cure, minutes | Tensile, #/in.² | Percent Elongation | Set, Percent | Shore Hardness Creep | Tear, #/in. |
|---|---|---|---|---|---|---|
| Asphaltic Oil | 45 | 2,390 | 245 | 6 | 71–68 | 138 |
| Do | 60 | 2,410 | 265 | 7 | 70–67 | 142 |
| Do | 90 | 2,230 | 260 | 6 | 68–65 | 158 |
| Califlux TT | 60 | 2,670 | 270 | 6 | 71–68 | 132 |

EXAMPLE II

A formula containing the same constituents in the same parts by weight as the basic test formula of Example I is compounded in the same manner. The asphaltic oil employed in this Example is one derived by cold precipitation of asphaltenes from a bituminous residue (asphalt) with pentane and then percolating the resultant oil-resin mixture in pentane solution through fuller's earth to remove the resins as described in copending application Serial No. 218,480. The test results obtained were fully comparable with those obtained in Example I. However, the asphaltic oil of this example is considered lower (substantially free) in active polar groups than the asphaltic oil of Example I and is therefore preferred.

EXAMPLE III

The pigmentation properties of the asphaltic oils of the present invention were compared with the pigmentation properties of asphalt, asphaltenes and petrolenes. Equal quantities of these respective extenders and softeners were pigmented with sufficient rouge to obtain a selected shade of red. The percent by weight of rouge required to obtain this shade of red for each of these extenders and softeners is as follows:

| Extender and softener: | Percent rouge |
|---|---|
| Asphaltenes | 40–50 |
| Asphalt | 30–35 |
| Petrolenes (oil+35% resins) | 15–20 |
| Asphaltic oil | 5–10 |

The above data indicate the relative ease of pigmentation of rubber including the asphaltic oils as extenders and softeners as compared with rubbers including prior art asphalt derived extenders and softeners.

I claim:

1. A method of preparing a rubber composition comprising the steps of incorporating about 1–25% by weight of asphaltic oil derived from asphaltic bituminous materal with rubber selected from the group consisting of natural rubber, polychloroprene, homo-polymers of conjugated diolefins and copolymers of conjugated diolefins and ethylenically unsaturated monomers, the asphaltic oil having a Saybolt-Furol viscosity at 210° F. of 35–100 seconds, a specific gravity at 60° F. of about 0.97 and a viscosity index of at least about 70.

2. A method of preparing a rubber composition comprising the steps of incorporating about 1–25% by weight of asphaltic oil derived from asphaltic bituminous material with rubber selected from the group consisting of natural rubber, polychloroprene, homo-polymers of conjugated diolefins and copolymers of conjugated diolefins and ethylenically unsaturated monomers, the asphaltic oil having a Saybolt-Furol viscosity at 210° F. of 35–65 seconds, a specific gravity at 60° F. of about 0.97 and a viscosity index of at least about 70.

3. A method of preparing a rubber composition comprising the steps of mixing latex selected from the group consisting of natural rubber latex, polychloroprene latex, latices of homo-polymers of conjugated diolefins and latices of copolymers of conjugated diolefins and ethylenically unsaturated monomers with about 1–25% by weight of an emulsified asphaltic oil derived from asphaltic bituminous material, the asphaltic oil having a Saybolt-Furol viscosity at 210° F. of 35–100 seconds, a specific gravity at 60° F. of about 0.97 and a viscosity index of at least about 70, and coagulating the mixture with a coagulant to form a masterbatch.

4. A method of preparing a rubber composition comprising the steps of mixing latex selected from the group consisting of natural rubber latex, polychloroprene latex, latices of homo-polymers of conjugated diolefins and latices of copolymers of conjugated diolefins and ethylenically unsaturated monomers with about 1–25% by weight of an emulsified asphaltic oil derived from asphaltic bituminous material, the asphaltic oil having a Saybolt-Furol viscosity at 210° F. of 35–65 seconds, a specific gravity at 60° F. of about 0.97 and a viscosity index of at least about 70, and coagulating the mixture with a coagulant to form a masterbatch.

References Cited in the file of this patent

UNITED STATES PATENTS 2,783,188    Agoston    Feb. 26, 1957

OTHER REFERENCES

Weinstock et al.: Industrial and Engineering Chemistry, May 1953, pages 1038–1053.

Asphalts and Allied Substances by Abraham, 4th edition, page 409.

Rubber Age, volume 69, August 1951, page 571.

Industrial and Engineering Chemistry, March 1949, pages 598–608.